United States Patent
Chen et al.

[11] Patent Number: 5,821,344
[45] Date of Patent: *Oct. 13, 1998

[54] PREPARATION OF SELF-ACID-DOPED SULFONIC ACID RING-SUBSTITUTED POLYANILINE IN ITS AQUEOUS FORM, AND POLYMER BLENDS MADE THEREFROM

[75] Inventors: Show-An Chen; Gue-Wuu Hwang, both of Hsinchu, Taiwan

[73] Assignee: National Science Council, Taipei, Taiwan

[*] Notice: The term of this patent shall not extend beyond the expiration date of Pat. No. 5,641,859.

[21] Appl. No.: 787,131
[22] Filed: Jan. 22, 1997

Related U.S. Application Data

[63] Continuation-in-part of Ser. No. 731,213, Jul. 12, 1995, Pat. No. 5,641,859.
[51] Int. Cl.$^6$ .................................................. C08G 73/00
[52] U.S. Cl. .......................... 528/422; 528/373; 528/391
[58] Field of Search ................................... 528/422, 391, 528/373

[56] References Cited

U.S. PATENT DOCUMENTS 5,641,859  6/1997  Chen et al. ............................. 528/422

OTHER PUBLICATIONS

Show an Chen et al., "Structure Characterization of Self-Acid-Doped Sulfonic Acid Ring Substitutes Polyaniline in its Aqueous Form and as Solid Film", Macromolecules, 1996, vol. 29, No. 11, pp. 3950–3955.

Show an Chen et al. Synthesis of Water Soluble Self-Acid-Doped Polyaniline J. Am. Chem. Soc. 1994, 116, pp. 7939–7940.

Hany et al. "Polyanilines With Covalently Bonded Alcyl Selfonates as Doping Agent. Synthesis and Properties", Synthetic Metals, 31 (1989), 369–378.

*Primary Examiner*—Duc Truong
*Attorney, Agent, or Firm*—W. Wayne Liauh

[57] ABSTRACT

The present invention discloses a process for preparing an aqueous solution of self-acid-doped o-sulfonic acid ring-substituted polyaniline, which can be cast into free-standing films. The process involves dissolving a solid o-sulfonic acid ring-substituted polyaniline in an alkaline aqueous solution to form an aqueous solution of an undoped o-sulfonate ring-substituted polyaniline; purifying the aqueous solution of the undoped o-sulfonate ring-substituted polyaniline by subjecting it to a purifying treatment to remove excess alkali therefrom; and contacting the resulting purified aqueous solution with a $H^+$-type ion-exchange resin to form an aqueous solution containing a self-acid-doped o-sulfonic acid ring-substituted polyaniline. A suitable water soluble polymer or polymer emulsion can be easily mixed with the aqueous solution containing the self-acid-doped o-sulfonic acid ring-substituted polyaniline to form a polymer blend.

32 Claims, 1 Drawing Sheet

PREPARATION OF SELF-ACID-DOPED SULFONIC ACID RING-SUBSTITUTED POLYANILINE IN ITS AQUEOUS FORM, AND POLYMER BLENDS MADE THEREFROM

This is a continuation-in-part application of application Ser. No. 07/731,213, filed Jul. 12, 1995 now U.S. Pat. No. 5,641,859.

BACKGROUND OF THE INVENTION

Polyaniline (PAn) is stable in air and has a relatively low manufacturing cost. In addition, PAn has been found to be very useful in various applications, such as: material for making battery electrodes due to its oxidation-reduction properties, material for making pH sensor due to its proton exchange property, material for making a display element due to its electrochromic property, and electromagnetic interference shielding and antistatic coating. Moreover, in 1990, Bridgestone Co. of Japan [(U.S. Pat. No. 5,066,556 (1991); U.S. Pat. No. 4,957,833 (1990)] used polyaniline deposited on a current collector as a working electrode in conjunction with a lithium electrode to produce a button battery with a discharge capacity of 80 Ahr/kg. Ricoh Co. of Japan [U.S. Pat. No. 4,999,263 (1991); U.S. Pat. No. 4,948,685 (1990)] used a polyaniline membrane of 0.05 mm thick deposited on a porous metallic membrane to produce a film-type battery with outside dimensions of 50 mm long, 50 mm wide and 0.9 mm thick. Sony Co. of Japan (Modern Plastics Int., Aug. (1991) 33) utilized polyaniline as an antistatic layer on a high density magnetic memory disc (4 M).

Polyaniline (PAn) basically has a structure which can be represented by the following formula (Faraday Discuss Chem. Soc., 88 (1989) 317):

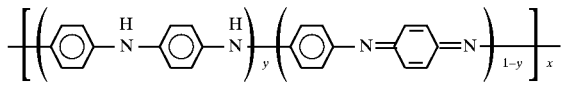

wherein $0 \leq y \leq 1$. It is termed leucoemeraldine, emeraldine and pernigraniline, when y is 0, 0.5 and 1, respectively.

A conjugated conducting polymer in general has a conductivity of about $10^{-12} \sim 10^{-19}$ S/cm in the undoped state, which is increased to a value of about $10^0 \sim 10^5$ S/cm after the conjugated conducting polymer is oxidatively doped. Polyaniline (PAn) is different from other conjugated conducting polymers in that it can be doped to become a conducting form without requiring their $\pi$-electrons to be changed through protonation by exposure to an appropriate protonic acid in aqueous solution [Chiang, J. C.; MacDiarmid, A. G. Synth. Met. 1986, 13, 193–205]. Yue and Epstein have synthesized a protonic acid self-doped PAn by reaction of emeraldine base with fuming sulfuric acid to give a sulfonic acid ring-substituted PAn having a conductivity of 0.1 S/cm; however, it is insoluble in the acid form (doped) and can be made soluble only when it is converted to the salt form (undoped) [Yue, J.; Epstein, A. J. J. Am. Chem. Soc. 1990, 112, 2800–2801. Yue, J.; Wang, Z. H.; Cromack, K. R.; Epstein, A. J.; MacDiarmid, A. G. J. Am. Chem. Soc. 1991, 113, 2665–2671]. Genies et al. also have attempted to synthesize a self-doped PAn by reaction of emeraldine base directly with propane or butane sultone [Hany, P.; Genies, E. M.; Santier, C. Synth. Met. 1989, 31, 369–378]. However, the reaction product has a very poor solubility and low conductivity ($\sim 10^{-9}$ S/cm). So far, all the self-acid-doped PAns reported in the above-mentioned prior art are insoluble, and thus their applications are limited. Dao and co-workers have synthesized a water soluble polyaniline, poly(aniline-propanesulfonic acid) (PAPSA), by reaction of leucoemeraldine base (a fully reduced PAn) with propane-sultone [Bergeron, J. Y.; Chevalier, J. W.; Dao, L. H. J. Chem. Soc., Chem. Commun. 1990, 180–182]. However. the PAPSA is supposed to have no imine nitrogen (—N=) to allow self-acid-doping, although they have claimed the appearance of a strong absorption band at about 900 nm, which always appears for protonic acid-doped PAn. Recently, IBM reported that a water-soluble poly(aniline—co—N—(4—sulfophenyl)aniline) has been synthesized by copolymerization [Macromolecules 1994, 27, 3625–3631]. However, this product was found via elemental analysis that it is not self-acid-doped, but is HCl-doped PAn. In addition, this PAn is only soluble in aqueous $NH_4OH$ solution and is not soluble in water.

The present inventors in a pending U.S. Pat. application Ser. No. 08/501,593 filed Jul. 12, 1995, disclose a process for preparing a water-soluble self-acid-doped polyaniline in its aqueous form and as a solid film, which comprises reacting a polyaniline with a strong base to convert the amino nitrogen thereof to anionic nitrogen; reacting sultone with the anionic nitrogen to form a side chain alkanesulfonic acid group; doping with protonic acid to form precipitate; dissolving (undoping) the precipitate in an alkaline aqueous solution; removing excess alkali from the alkaline aqueous solution; and contacting the resulting aqueous solution with an $H^+$-type ion exchange resin. The $H^+$-exchanged aqueous solution can be cast to form a solid film of water-soluble self-acid-doped PAn, or can be mixed with an additional water soluble polymer, aqueous solution of water soluble polymer or polymer emulsion, which can then be cased into a polymer blend film.

DETAILED DESCRIPTION OF THE INVENTION

Figure 1:
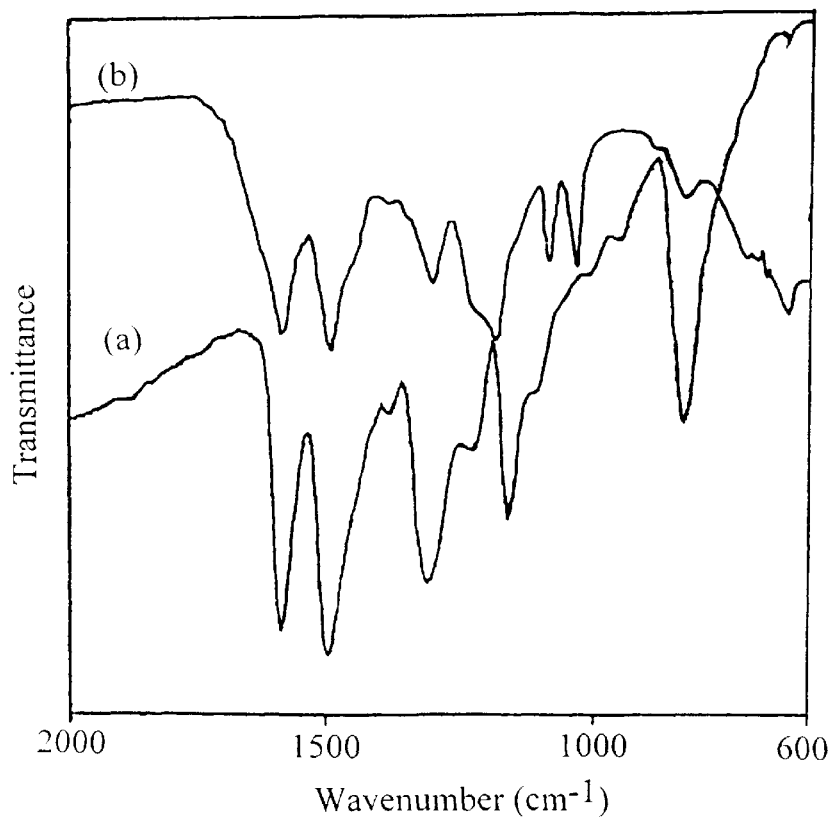
FIG. 1 shows IR spectra of polyaniline (curve a) and sodium salt of o-sulfonic acid ring-substituted polyaniline (curve b).

Here, we report a novel process of preparation of an aqueous solution of a self-acid-doped sulfonic acid ring-substituted polyaniline (SPAN), which can be concentrated to a solid content of at least 50 wt %, which is very stable for more than one year and was then used for preparation of solid film through casting. In one of the preferred embodiments of the present invention, a film formed from an aqueous solution of SPAN exhibited a conductivity of $10^{-2} \sim 10^{-3}$ S/cm without external doping. This conductivity is sufficiently high so that the film made from the aqueous solution of SPAN disclosed in the present invention can be used as an electromagnetic interference shielding (EMI shielding) ($10^{-3}$ S/cm), electrostatic-discharge (ESD) ($10^{-5}$ S/cm) or antistatic ($10^{-9}$ S/cm) material. Moreover, the aqueous solution of SPAN can be easily mixed with a water soluble polymer or polymer emulsion, which can then be cast into a polymer blend film having improved mechanical properties and adhesion strength to a substrate, and thus facilitating the workability of the SPAN of the present invention in various applications.

A process for preparing a self-acid-doped sulfonic acid ring-substituted polyaniline in accordance with the present invention comprises the following steps:

a) dissolving a solid o-sulfonic acid ring-substituted polyaniline having formula (I) as follows in an alkaline aqueous solution to form an aqueous solution of an undoped o-sulfonate ring-substituted polyaniline (please note that the formula (I) shown is in the undoped state for simplicity):

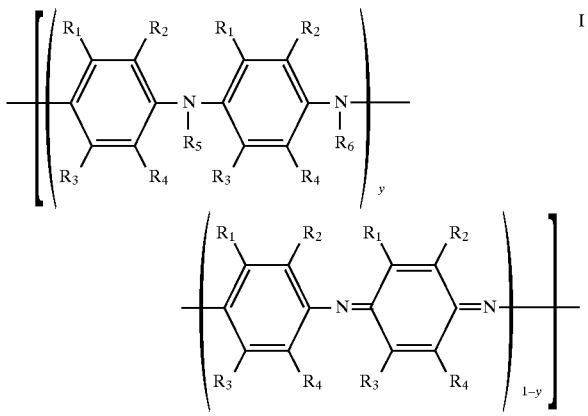

wherein $R_1$, $R_3$, $R_5$ and $R_6$ are —H; $R_2$ and $R_4$ are independently —H, —OCH$_3$, —CH$_3$, —C$_2$H$_5$, —C$_3$H$_7$, —OR$_7$, —SR$_7$, —F, —Cl, —Br, —I, —COR$_7$, —OCOR$_7$, —NHCOR$_7$, —NO$_2$, —COOR$_7$, —CN, —SO$_3$H or —R$_7$SO$_3$H, provided that at least a fraction of $R_2$ and $R_4$ is —SO$_3$H or —R$_7$SO$_3$H, and said fraction ranges from 20 to 100 mol %, wherein $R_7$ is a lower alkyl, aryl or aryl (lower alkyl); $0 \leq y \leq 1$; and n is an integer equal to or greater than 2, and preferably less than 5000;

b) purifying the aqueous solution of said undoped o-sulfonate ring-substituted polyaniline from step a) by subjecting it to a purifying treatment, such as a dialysis treatment with a semipermeable membrane in deionized water, to remove excess alkali in said aqueous solution; and c) contacting the resulting purified aqueous solution of step b) with a H$^+$-type ion-exchange resin to form an aqueous solution containing a elf-acid-doped o-sulfonic acid ring-substituted polyaniline.

Preferably, y is 0.5.

Preferably, at least a fraction of $R_2$ and $R_4$ is —SO$_3$H, and the rest fraction of the $R_2$ and $R_4$ is hydrogen.

Preferable, said fraction of $R_2$ and $R_4$ in the repeating units of formula (I) being —SO$_3$H or —R$_7$SO$_3$H is about 25 mol %.

Preferably, the present process further comprises a step d) evaporating water from said aqueous solution containing said self-acid-doped o-sulfonic acid ring-substituted polyaniline of step c) to form a concentrated aqueous solution thereof. Said concentrated aqueous solution containing said self-acid-doped o-sulfonic acid ring-substituted polyaniline can be cast or coated onto a substrate to form a self-acid-doped o-sulfonic acid ring-substituted polyaniline film. Once the self-acid-doped o-sulfonic acid ring-substituted polyaniline is cast or coated to form a solid film, it is no longer water soluble.

Said alkaline aqueous solution used in step a) can be an aqueous solution of NaOH, KOH or NH$_4$OH.

Said purifying treatment in step b), in addition to dialysis treatment, may include any suitable treatment which can remove excess alkali from said aqueous solution containing the undoped o-sulfonate ring-substituted polyaniline of step a), for example H$^+$-type ion exchange treatment. The excess alkali means the cation of the alkali dissolved in the alkaline aqueous solution which is not attracted by the anionic sulfonic acid group, i.e. the amount of alkali exceeding the stoichmetric amount for undoping the acid form (doped) water insoluble o-sulfonic acid ring-substituted polyaniline.

A suitable water soluble polymer or polymer emulsion can be easily mixed with the aqueous solution containing the self-acid-doped o-sulfonic acid ring-substituted polyaniline of step c) to form a polymer blend, in which the mixing ratio of said suitable water soluble polymer ranges from 5 to 95% based on the total weight of the polymers. Said suitable water soluble polymer is selected from the group consisting of poly(ethylene oxide) (PEO), poly(vinyl methyl ether) (PVME), poly(ethylene imine) (PEI) and its esters, poly(acrylic acid) (PAA) and its esters, polyacrylamide (PAAm), poly(methacrylic acid) (PMAA) and its esters, polymethacrylamide (PMAAm), poly(N,N-dimethylacrylamide), poly (N-isopropylacrylamide) (PIPAAm), poly(N-acrylylglycinamide) (PAG), poly(N-methacrylylglycinamide) (PMAG), acrylic copolymers, poly(vinyl alcohol) (PVA), poly(vinyl acetate) (PVAc), poly(vinyl acetate-co-vinyl alcohol) (PVAA), polyvinylpyrrolidone (PVP), poly(styrene sulfonic acid) (PSSA) and its esters, poly(ethylenesulfonic Acid) (PESA) and its esters, poly(phosphoric acid) (PPA) and its salts, poly(silicic acid) (PSiA) and its salts, polyvinylamine (PVAm), poly(2-vinylpyridine) (P2VP) and its salts, poly(4-vinylpyridine) (P4VP) and its salts, poly(vinyl sulfuric acid) (PVSA) and its salts, poly(vinyl alcohol-co-vinyl sulfuric acid and its salts, poly(diallyldimethylammonium chloride), poly(vinylphosphonic acid) and its salts, poly(maleic acid) and its salts, poly(2-methacryloyloxyethane-1-sulfonic acid) and its salts, poly(3-methacryloyloxypropane-1-sulfonic acid) and its salts, poly(4-vinylbenzoic acid) and its salts, poly(4-vinylbenzyltrimethylammonium salts), poly[3-(vinyloxy) propane-1-sulfonic acid] and its salts, poly(4-vinylphenol) and its salts, poly(2-vinylpiperidine) and its salts, poly(4-vinylpiperidine) and its salts, and poly (N-vinylsuccinamidic acid) and its salts.

Said water soluble polymers for use in making said polymer blend have the following repeating units:

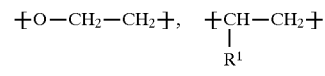

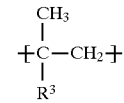

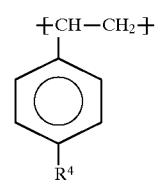

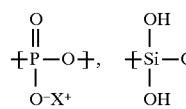 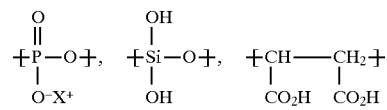

-continued

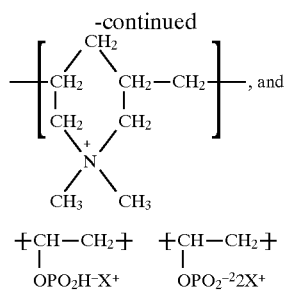

wherein $^1$=OH, OCH$_3$, OCOCH$_3$, CONH$_2$, CON(CH$_3$)$_2$, CONHCH(CH$_3$)$_2$, CONHCONH$_2$ COO$^-$X$^+$, NHCO(CH$_2$)$_2$COO$^-$X$^+$, SO$_3^-$X$^+$, OSO$_3^-$X$^+$, O(CH$_2$)$_3$SO$_3^{31}$ X$^+$, NH$_2$,

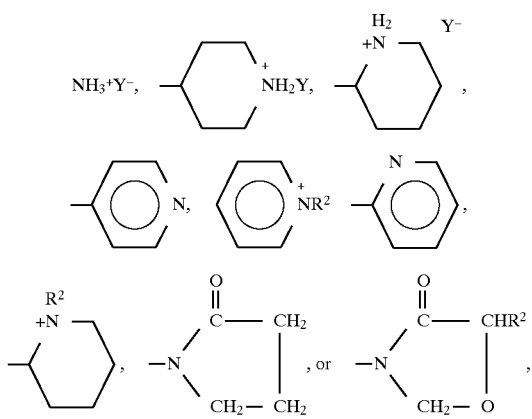

wherein R$^2$ is —H or —CH$_3$;
R$^3$ is CONH$_2$, CONHCH$_2$CONH$_2$, COO$^-$X$^+$, or COO(CH$_2$)$_m$SO$_3^-$X$^+$, wherein m is 2 or 3; and
R$^4$ is —O$^-$X$^+$, COO$^-$X$^+$, SO$_3^-$X$^+$, OSO$_3^-$X$^+$, or N$^+$(CH$_3$)$_4$Y$^{31}$,
wherein X$^+$ is a cation and Y$^-$ is an anionic ion.

The invention will be further illustrated by the following examples which are only meant to illustrate the invention, but not to limit it. In the following examples the polymers of formulas (II) to (V) were synthesized:

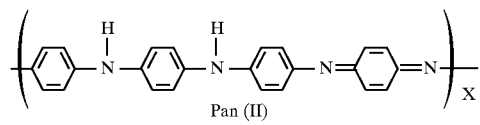
Pan (II)

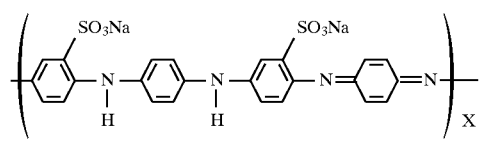
SPANNa (II)

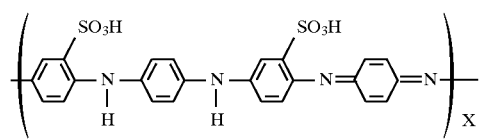
SPAN (IV)

Example 1

Preparation of emeraldine base form of polyaniline (PAn)

The emeraldine base form of polyaniline (PAn, polymer II) was synthesized by a chemical oxidation method similar to that of MacDiarmid and co-workers [Chiang, J. C.; MacDiarmid, A. G. Synth. Met. 1986, 13, 193–205].

To 200 mL 1M HCI aqueous solution 9.3 mL aniline monomer was added. To another 200 1M HCI aqueous solution 34.23 g (NH$_4$)$_2$S$_2$O$_8$ oxidant was added. The oxidant solution was added dropwise to the monomer solution in an ice bath while stirring and introducing nitrogen therein. The reaction was carried out for 9 hours, the resulting polyaniline precipitate was separated from the reaction mixture by filtration, and washed with 1M HCI aqueous solution and deionized water until the filtrate became colorless. The washed polyaniline was undoped by introducing into 1M NH$_4$OH aqueous solution. The mixture was stirred for 24 hours and the insoluble polyaniline was separated by filtration, and washed with deionized water until the filtrate become neutral. The washed polyaniline was dried under vacuum for 48 hours or more to obtain an undoped polyaniline (PAn) powder of formula (II).

The emeraldine base so obtained has an oxidation level of about 0.5 as determined from its N (1s) core level spectrum obtained using X-ray photoelectron spectroscopy (XPS), which can be deconvoluted into two peaks with approximately equal areas, one centered at 398.3±0.1 eV (due to the imine nitrogen) and the other located at 399.4±0.1 eV (due to the amine nitrogen). Gel permeation chromatography (GPC) analysis with N-methyl-2-pyrrolidone (NMP) as eluent exhibits a bimodel molecular weight distribution. For the high-molecular-weight fraction, the weight average molecular weight is about 1×10$^6$, and for the low-molecular-weight fraction, about 1100, as compared with polystyrene standards.

Example 2

Preparation of o-sulfonic acid ring-substituted polyaniline

The acid form (doped) o-sulfonic acid ring-substituted polyaniline was prepared by sulfonation of the emeraldine base prepared in Example 1 as described by Yue and Epstein [J Am. Chem. Soc., 112 (1990) 2800]. The emeraldine base (3 g) prepared in Example 1 was sulfonated by dissolving in 240 mL of fuming sulfonic acid with constant stirring in an ice bath for three hours. The resulting dark purple solution was then precipitated with methanol, the temperature being held between 10° and 30° C. by an ice bath. The precipitate was then washed by a large amount of methanol until the filtrate had a pH of 7 to obtain an acid form (doped) o-sulfonic acid ring-substituted polyaniline product.

Example 3

Preparation of self-acid-doped o-sulfonic acid ring-substituted polyaniline (SPAN)

In the present example. a self-acid-doped o-sulfonic acid ring-substituted polyaniline (SPAN) was prepared according to the following Scheme 1.

Scheme 1

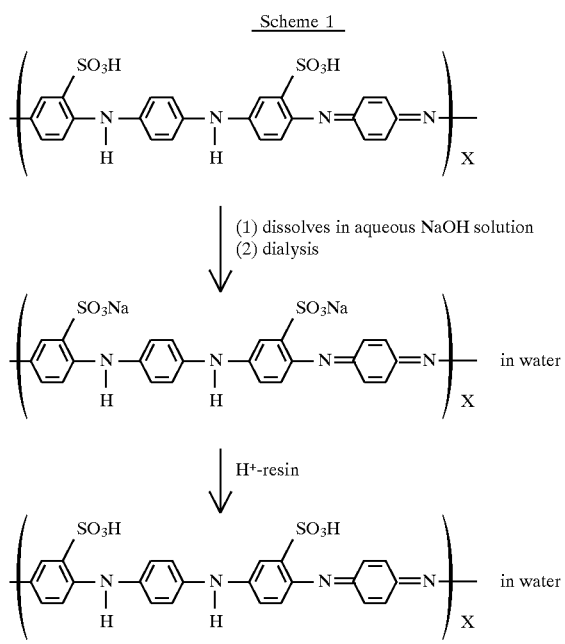

The product of acid form (doped) o-sulfonic acid ring-substituted polyaniline prepared in Example 2, which is soluble in an alkaline aqueous solution but substantially insoluble in water, was dispersed in deionized water and then a suitable amount of aqueous NaOH solution was added to dissolve the acid form (doped) o-sulfonic acid ring-substituted polyaniline while undoping the acid form (doped) o-sulfonic acid ring-substituted polyaniline completely. The resulting undoped alkaline solution was filtered to remove a trace amount of solid residue therein and was then purified by dialysis with a semipermeable membrane (Spectra/Por 3 membrane, molecular weight cutoff, 3500) in deionized (DI) water, which was replaced with fresh DI water frequently for 3 days. The sodium salt of o-sulfonic acid ring-substituted polyaniline, SPANNa (III), aqueous solution so obtained is blue in color. The SPANNa (III) in the aqueous solution was then converted to self-acid-doped o-sulfonic acid ring-substituted polyaniline, SPAN (IV), by exchanging Na$^+$ for H$^+$ using H$^+$-type ion-exchange resin (IR 120H resin from Rohm and Haas Co.) to give a stable water solution green in color. This aqueous solution was concentrated in a vacuum evaporator at a temperature below 40° C. and then coated on a glass plate to form a thin film which has a conductivity of 1×10$^{-2}$ S/cm under dry nitrogen atmosphere measured by four-point probe method. Please note that the formula (IV) shown is in the undoped state for simplicity FIG. 1 shows the IR spectra of the PAn (curve a) and SPANNa (curve b). The IR spectrum of the SPANNa shows that the ratio of the absorption intensity at 1595 cm$^{-1}$ ($v_{N=Q=N}$)/1500 cm$^{-1}$ ($v_{Ar\ C=C}$) is the same as the corresponding ratio in the emeraldine base PAn, indicating an oxidation level of about 0.5. This also indicates that an oxidation reaction does not take place during the synthesis of SPANNa. The presence of the absorption peaks at 1182 ($v_{as}$ SO$_2$), 1081($v_S$ SO$_2$), 704 and 625 cm$^{-1}$($v_{S-O}$) indicate the existence of SO$_3$—groups. The presence of absorption peaks at 873 and 821 cm$^{-1}$ (C—H out-of-plane bending of the 1,2,4-trisubstituted benzene ring) indicate that SO$_3$— groups are linked on the ortho-positions of the benzene ring.

Elemental analysis for SPAN gives C, 44.94%; H, 8.79%; N, 8.79%; S, 9.68%; O,32.13%, wherein the percentage of O is obtained by deducting the percentages of C, H, N and S from 100%. The S/N atomic ratio of 0.48 implies that almost every two benzene rings have one benzene ring (about 50% of the benzene rings) in the polymer linked with a —SO$_3$H group.

Figure 2:
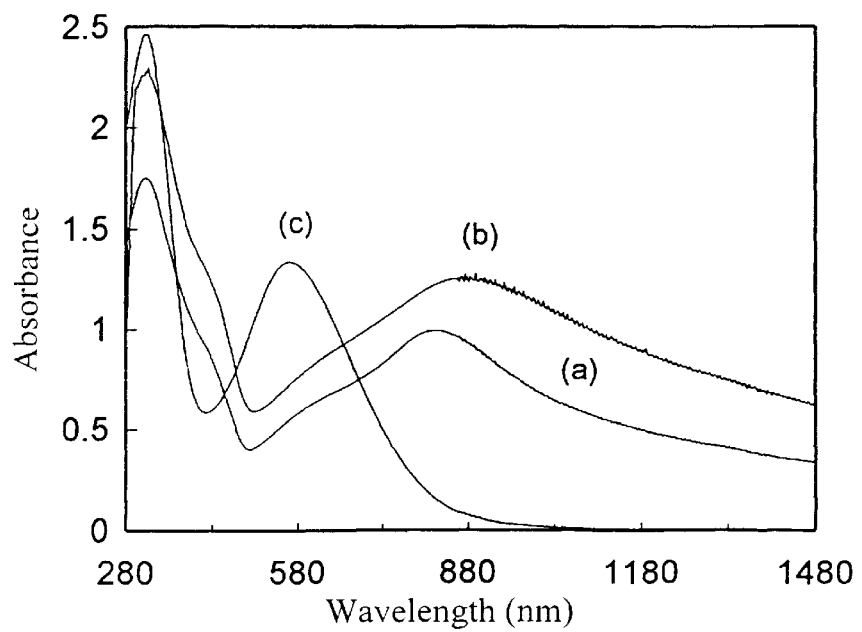
FIG. 2 shows UV-vis spectra of o-sulfonic acid ring-substituted polyaniline in an aqueous solution (curve a), as a solid film coated on a glass substrate (curve b) and in an aqueous solution neutralized with ~2% NaOH aqueous solution (curve c).

The SPAN synthesized in this example is in the doped state, as can be confirmed by the UV-vis electronic spectra in its various forms. The SPAN aqueous solution is green in color and its UV-vis electronic spectrum [FIG. 2, curve (a)] exhibits a π–π* transition of the benzenoid rings at 313 nm [J. Am. Chem. Soc., 108 (1986) 8311], and polaron/bipolaron band transitions at 420 nm and 830 nm [(Phys. Rev. Lett., 59 (1987) 1464]. The SPAN aqueous solution was coated on a glass plate to form a thin film which is a green transparent film. The thin film has an UV-vis electronic spectrum [FIG. 2, curve (b)] exhibits absorbance peaks at 313, 420 and 880 nm which are similar to those of the SPAN aqueous solution. As the SPAN aqueous solution was converted to SPANNa by neutralization with ~2% of NaOH (aqueous), the polaron/bipolaron bands disappear and a strong exciton transition of the quinoid rings at 565 nm [Phys. Rev. Lett., 59 (1987) 1464] grows at the same time (FIG. 2, curve c).

Furthermore, the electron spin resonance (ESR) measurement on the aqueous solution of SPAN (0.1 wt %) gives an ESR signal with a g value of 2.0029, a peak-to-peak line width $\Delta H_{pp}$ of 2.88 G and a spin density of 9.1×10$^{19}$ spin/g; and that on the film of SPAN gives an ESR signal with $\Delta H_{pp}$=1.6 G and a spin density of 8.3×10$^{19}$ spin/g and g =2.0029 (both values being rather close to those of HCl-doped PAn (2.2×10$^{20}$ spin/g, g=2.002868)). The presence of free spins indicates that polarons exist in the self-doped SPAN in both the aqueous solution and solid films.

Example 4
Preparation of PVAl/SPAN polymer blend films 0.025 g/mL polyvinyl alcohol (PVAl) aqueous solution was prepared by using a polyvinyl alcohol having a weight average molecular weight of 1.0×10$^5$ and a hydrolysis degree of 86–89% which is sold under a code BP-17 from Chang Chun Plastics Co., Ltd., Taiwan. An aqueous SPAN solution having a solid content of 0.025 g/mL was prepared by using the aqueous SPAN solution prepared in Example 3. Each polymer solution was measured according to the desired mixing ratios of 10, 50 and 90 wt % of SPAN, which were then well mixed with each other. Each mixture was coated on a glass substrate to form a film. The conductivity of the 10, 50 and 90 wt % SPAN films was measured by four-point method and havea value of 5×10$^{-5}$, 6×10$^{-4}$ and 8×10$^{-3}$ S/cm.

Example 5
Preparation of PEO/SPAN polymer blend film 0.0125 g/mL polyethylene oxide (PEO) aqueous solution was prepared by using a polyethylene oxide having a weight average molecular weight of 4.0×10$^6$ which is available from Polyscience, Inc., U.S.A. An aqueous SPAN solution having a solid content of 0.025 g/mL was prepared by using the aqueous SPAN solution prepared in Example 3. The former polymer solution was measured 10 mL and the latter was measured 5 mL, which were then well mixed with each other. The mixture was coated on a glass substrate to form a film. The conductivity of the film was measured by four-point method and has a value of 4×10$^{-4}$ S/cm.

Example 6
Preparation of PVAc/SPAN polymer blend film

A polyvinyl acetate (PVAc) emulsion having a solid content of 0.25 g/mL was prepared by using a polyvinyl acetate having an average particle diameter of 1 μm which is sold under a code PE-160 from Chang Chun Plastics Co., Ltd., Taiwan. An aqueous SPAN solution having a solid content of 0.025 g/mL was prepared by using the aqueous SPAN solution prepared in Example 3. The former was measured 1 mL and the latter was measured 10 mL, which were then well mixed with each other. The mixture was coated on a glass substrate to form a film. The conductivity of the film was measured by four-point method and has a value of $5 \times 10^{-4}$ S/cm.

Having thus described the present invention, which is now deemed appropriate for Letters Patent, is set out in the following appended claims.

What is claimed is:

1. A process for preparing a self-acid-doped sulfonic acid ring-substituted polyaniline comprising the following steps:
    a) dissolving a solid o-sulfonic acid ring-substituted polyaniline having formula (I) as follows in an alkaline aqueous solution to form an aqueous solution of an undoped o-sulfonate ring-substituted polyaniline, in which the formula (I) shown is in the undoped state for simplicity:

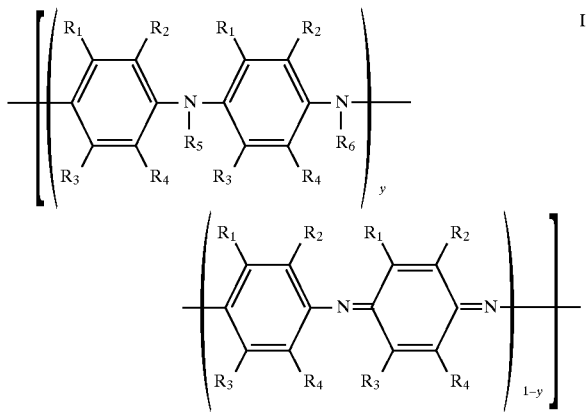

wherein $R_1$, $R_3$, $R_5$ and $R_6$ are —H; $R_2$ and $R_4$ are independently —H, —OCH$_3$, —CH$_3$, —C$_2$H$_5$, —C$_3$H$_7$, —OR$_7$, —SR$_7$, —F, —Cl, —Br, —I, —COR$_7$, —OCOR$_7$, —NHCOR$_7$, —NO$_2$, —COOR$_7$, —CN, —SO$_3$H or —R$_7$SO$_3$H, provided that at least a fraction of $R_2$ and $R_4$ is —SO$_3$H or —R$_7$SO$_3$H, and said fraction ranges from 20 to 100 mol %, wherein $R_7$ is a lower alkyl, aryl or aryl (lower alkyl); and $0<y<1$;
    b) purifying the aqueous solution of said undoped o-sulfonate ring-substituted polyaniline from step a) by subjecting it to a purifying treatment to remove excess alkali in said aqueous solution; and
    c) contacting the resulting purified aqueous solution of step b) with a H$^+$-type ion-exchange resin to form an aqueous solution containing a self-acid-doped o-sulfonic acid ring-substituted polyaniline.

2. The process in accordance with claim 1, wherein said alkaline aqueous solution used in step a) is an aqueous solution of NaOH, KOH or NH$_4$OH.

3. The process in accordance with claim 1, wherein said purifying treatment used in step b) is a dialysis treatment with a semipermeable membrane in deionized water.

4. The process in accordance with claim 1, wherein at least a fraction of said $R_2$ and $R_4$ is —SO$_3$H, and the rest fraction of said $R_2$ and $R_4$ is hydrogen.

5. The process in accordance with claim 1, wherein said fraction of $R_2$ and $R_4$ in the formula (I) being —SO$_3$H or —R$_7$SO$_3$H is about 25 mol %.

6. The process in accordance with claim 1, wherein said y is 0.5.

7. The process in accordance with claim 1 which further comprises a step d) evaporating water from said aqueous solution containing said self-acid-doped o-sulfonic acid ring-substituted polyaniline of step c) to form a concentrated aqueous solution thereof.

8. The process in accordance with claim 1, wherein said purifying treatment used in step b) is an H$^+$-type ion exchange treatment.

9. A process for preparing a self-acid-doped sulfonic acid ring-substituted polyaniline film comprising the following steps:
    a) dissolving a solid o-sulfonic acid ring-substituted polyaniline having formula (I) as follows in an alkaline aqueous solution to form an aqueous solution of an undoped o-sulfonate ring-substituted polyaniline, in which the formula (I) shown is in the undoped state for simplicity:

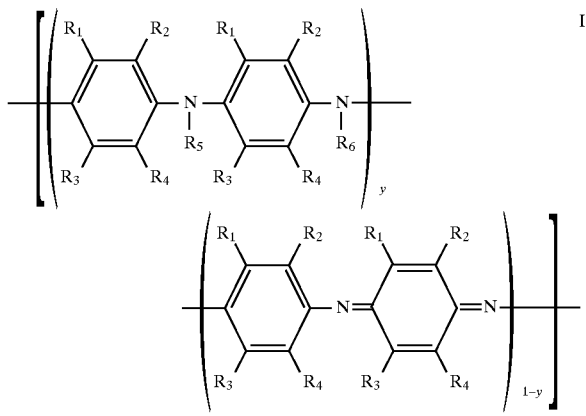

wherein $R_1$, $R_3$, $R_5$ and $R_6$ are —H; $R_2$ and $R_4$ are independently —H, —OCH$_3$, —CH$_3$, —C$_2$H$_5$, —C$_3$H$_7$, —OR$_7$, —SR$_7$, —F, —Cl, —Br, —I, —COR$_7$, —OCOR$_7$, —NHCOR$_7$, —NO$_2$, —COOR$_7$, —CN, —SO$_3$H or —R$_7$SO$_3$H, provided that at least a fraction of $R_2$ and $R_4$ is —SO$_3$H or —R$_7$SO$_3$H, and said fraction ranges from 20 to 100 mol %, wherein $R_7$ is a lower alkyl, aryl or aryl (lower alkyl); and $0<y<1$;
    b) purifying the aqueous solution of said undoped o-sulfonate ring-substituted polyaniline from step a) by subjecting it to a purifying treatment to remove excess alkali in said aqueous solution; and
    c) contacting the resulting purified aqueous solution of step b) with a H$^+$-type ion-exchange resin to form an aqueous solution containing a self-acid-doped o-sulfonic acid ring-substituted polyaniline;
    d) evaporating water from said aqueous solution containing said self-acid-doped o-sulfonic acid ring-substituted polyaniline of step c) to form a concentrated aqueous solution thereof; and
    e) casting or coating said concentrated aqueous solution from step d) onto a substrate to form a self-acid-doped o-sulfonic acid ring-substituted polyaniline film.

10. The process in accordance with claim 9, wherein said alkaline aqueous solution used in step a) is an aqueous solution of NaOH, KOH or NH$_4$OH.

11. The process in accordance with claim 9, wherein said purifying treatment used in step b) is a dialysis treatment with a semipermeable membrane in deionized water.

12. The process in accordance with claim 9, wherein at least a fraction of said $R_2$ and $R_4$ is —SO$_3$H, and the rest fraction of said $R_2$ and $R_4$ is hydrogen.

13. The process in accordance with claim 9, wherein said fraction of and $R_4$ in the formula (I) being —$SO_3H$ or —$R_7SO_3H$ is about 25 mol %.

14. The process in accordance with claim 9, wherein said y is 0.5.

15. The process in accordance with claim 9, wherein said purifying treatment used in step b) is an $H^+$-type ion exchange treatment.

16. A process for blending a self-acid-doped sulfonic acid ring-substituted polyaniline with a different polymer comprising the following steps:

a) dissolving a solid o-sulfonic acid ring-substituted polyaniline having formula (I) as follows in an alkaline aqueous solution to form an aqueous solution of an undoped o-sulfonate ring-substituted polyaniline, in which the formula (I) shown is in the undoped state for simplicity:

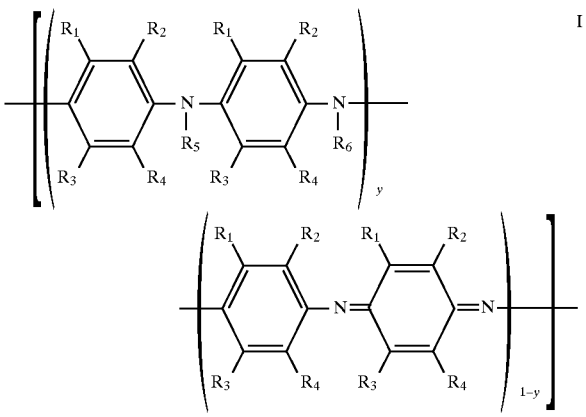

wherein $R_1$, $R_3$, $R_5$ and $R_6$ are —H; $R_2$ and $R_4$ are independently —H, —$OCH_3$, —$CH_3$, —$C_2H_5$, —$C_3H_7$, —$OR_7$, —$SR_7$, —F, —Cl, —Br, —I, —$COR_7$, —$OCOR_7$, —$NHCOR_7$, —$NO_2$, —$COOR_7$, —CN, —$SO_3H$ or —$R_7SO_3H$, provided that at least a fraction of $R_2$ and $R_4$ is —$SO_3H$ or —$R_7SO_3H$, and said fraction ranges from 20 to 100 mol %, wherein $R_7$ is a lower alkyl, aryl or aryl (lower alkyl); and 0<y<1;

b) purifying the aqueous solution of said undoped o-sulfonate ring-substituted polyaniline from step a) by subjecting it to a purifying treatment to remove excess alkali in said aqueous solution; and c) contacting the resulting purified aqueous solution of step b) with a $H^+$-type ion-exchange resin to form an aqueous solution containing a self-acid-doped o-sulfonic acid ring-substituted polyaniline;

d) adding a water soluble polymer, an aqueous solution of said water soluble polymer or a polymer emulsion to said aqueous solution containing a self-acid-doped o-sulfonic acid ring-substituted polyaniline of step c); and e) mixing the resulting mixture of step d).

17. The process in accordance with claim 16, wherein said alkaline aqueous solution used in step a) is an aqueous solution of NaOH, KOH or $NH_4OH$.

18. The process in accordance with claim 16, wherein said purifying treatment used in step b) is a dialysis treatment with a semipermeable membrane in deionized water.

19. The process in accordance with claim 16, wherein at least a fraction of said $R_2$ and $R_4$ is —$SO_3H$, and the rest fraction of said $R_2$ and $R_4$ is hydrogen.

20. The process in accordance with claim 16, wherein said fraction of $R_2$ and $R_4$ in the formula (I) being —$SO_3H$ or —$R_7SO_3H$ is about 25 mol %.

21. The process in accordance with claim 16, wherein said y is 0.5.

22. The process in accordance with claim 16, wherein said purifying treatment used in step b) is an $H^+$-type ion exchange treatment.

23. The process in accordance with claim 16, wherein said water soluble polymer and said polymer emulsion is selected from the group consisting essentially of poly(ethylene oxide) (PEO), poly(vinyl methyl ether) (PVME), poly (ethylene imine) (PEI) and its esters, poly(acrylic acid) (PAA) and its esters, polyacrylamide (PAAm), poly (methacrylic acid) (PMAA) and its esters, polymethacrylamide (PMAAm), poly(N,N-dimethylacrylamide), poly(N-isopropylacrylamide) (PIPAAm), poly(N-acrylylglycinamide) (PAG), poly(N-methacrylylglycinamide) (PMAG), acrylic copolymers, poly(vinyl alcohol) (PVA), poly(vinyl acetate) (PVAc), poly (vinyl acetate-co-vinyl alcohol) (PVAA), polyvinylpyrrolidone (PVP), poly(styrene sulfonic acid) (PSSA) and its esters, poly(ethylenesulfonic Acid) (PESA) and its esters, poly(phosphoric acid) (PPA) and its salts, poly(silicic acid) (PSiA) and its salts, polyvinylamine (PVAm), poly(2-vinylpyridine) (P2VP) and its salts, poly(4-vinylpyridine) (P4VP) and its salts, poly(vinyl sulfuric acid) (PVSA) and its salts, poly(vinyl alcohol-co-vinyl sulfuric acid and its salts, poly(diallyldimethylammonium chloride), poly (vinylphosphonic acid) and its salts, poly(maleic acid) and its salts, poly(2-methacryloyloxyethane-1-sulfonic acid) and its salts, poly(3-methacryloyloxypropane-1-sulfonic acid) and its salts, poly(4-vinylbenzoic acid) and its salts, poly(4-vinylbenzyltrimethylammonium salts), poly[3-vinyloxy) propane-1-sulfonic acid] and its salts, poly(4-vinylphenol) and its salts, poly(2-vinylpiperidine) and its salts, poly(4-vinylpiperidine) and its salts, and poly(N-vinylsuccinamidic acid) and its salts.

24. A process for preparing a polymer blend film of a self-acid-doped sulfonic acid ring-substituted polyaniline and a polymer comprising the following steps:

a) dissolving a solid o-sulfonic acid ring-substituted polyaniline having formula (I) as follows in an alkaline aqueous solution to form an aqueous solution of an undoped o-sulfonate ring-substituted polyaniline, in which the formula (I) shown is in the undoped state for simplicity:

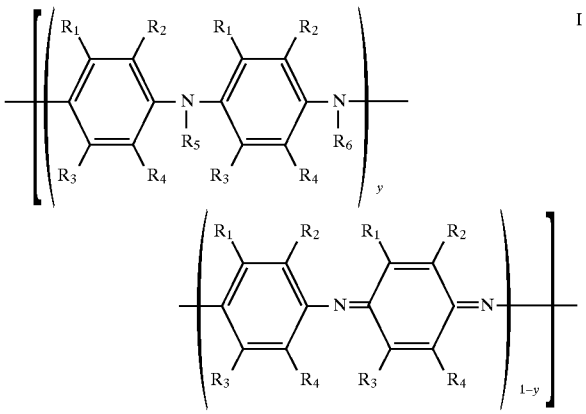

wherein $R_1$, $R_3$, $R_5$ and $R_6$ are —H; $R_2$ and $R_4$ are independently —H, —$OCH_3$, —$CH_3$, —$C_2H_5$, $_{C3}H_7$, —$OR_7$, —$SR_7$, —F, —Cl, —Br, —I, —$COR_7$, —$OCOR_7$, —$NHCOR_7$, —$NO_2$, —$COOR_7$, —CN, —$SO_3H$ or —$R_7SO_3H$, provided that at least fraction of $R_2$ and $R_4$ is —$SO_3H$ or —$R_7SO_3H$, and said fraction ranges from 20 to 100 mol %, wherein $R_7$ is a lower alkyl, aryl or aryl (lower alkyl); and $0<y<1$;

b) purifying the aqueous solution of said undoped o-sulfonate ring-substituted polyaniline from step a) by subjecting it to a purifying treatment to remove excess alkali in said aqueous solution; and c) contacting the resulting purified aqueous solution of step b) with a $H^+$-type ion-exchange resin to form an aqueous solution containing a self-acid-doped o-sulfonic acid ring-substituted polyaniline;

d) adding a water soluble polymer, an aqueous solution of said water soluble polymer or a polymer emulsion to said aqueous solution containing a self-acid-doped o-sulfonic acid ring-substituted polyaniline of step c);

e) mixing the resulting mixture of step d);

f) evaporating water from the resulting mixture of step e) to form a concentrated aqueous solution thereof; and g) casting or coating said concentrated aqueous solution from step f) onto a substrate to form a polymer blend film.

25. The process in accordance with claim 24, wherein said alkaline aqueous solution used in step a) is an aqueous solution of NaOH, KOH or $NH_4OH$.

26. The process in accordance with claim 24, wherein said purifying treatment used in step b) is a dialysis treatment with a semipermeable membrane in deionized water.

27. The process in accordance with claim 24, wherein at least a fraction of said $R_2$ and $R_4$ is —$SO_3H$, and the rest fraction of said $R_2$ and $R_4$ is hydrogen.

28. The process in accordance with claim 24, wherein said fraction of $R_2$ and $R_4$ in the formula (I) being —$SO_3H$ or —$R_7SO_3H$ is about 25 mol %.

29. The process in accordance with claim 24, wherein said y is 0.5.

30. The process in accordance with claim 24, wherein said purifying treatment used in step b) is an $H^+$-type ion exchange treatment.

31. The process in accordance with claim 24, wherein said water soluble polymer and said polymer emulsion is selected from the group consisting essentially of poly(ethylene oxide) (PEO), poly(vinyl methyl ether) (PVME), poly(ethylene imine) (PEI) and its esters, poly(acrylic acid) (PAA) and its esters, polyacrylamide (PAAm), poly(methacrylic acid) (PMAA) and its esters, polymethacrylamide (PMAAm), poly(N,N-dimethylacrylamide), poly(N-isopropylacrylamide) (PIPAAm), poly(N-acrylylglycinamide) (PAG), poly(N-methacrylylglycinamide) (PMAG), acrylic copolymers, poly(vinyl alcohol) (PVA), poly(vinyl acetate) (PVAc), poly(vinyl acetate-co-vinyl alcohol) (PVAA), polyvinylpyrrolidone (PVP), poly(styrene sulfonic acid) (PSSA) and its esters, poly(ethylenesulfonic Acid) (PESA) and its esters, poly(phosphoric acid) (PPA) and its salts, poly(silicic acid) (PSiA) and its salts, polyvinylamine (PVAm), poly(2-vinylpyridine) (P2VP) and its salts, poly(4-vinylpyridine) (P4VP) and its salts, poly(vinyl sulfuric acid) (PVSA) and its salts, poly(vinyl alcohol-co-vinyl sulfuric acid and its salts, poly(diallyldimethylammonium chloride), poly(vinylphosphonic acid) and its salts, poly(maleic acid) and its salts, poly(2-methacryloyloxyethane-1-sulfonic acid) and its salts, poly(3-methacryloyloxypropane-1-sulfonic acid) and its salts, poly(4-vinylbenzoic acid) and its salts, poly(4-vinylbenzyltrimethylammonium salts), poly[3-(vinyloxy) propane-1-sulfonic acid] and its salts, poly(4-vinylphenol) and its salts, poly(2-vinylpiperidine) and its salts, poly(4-vinylpiperidine) and its salts, and poly(N-vinylsuccinamidic acid) and its salts.

32. The process in accordance with claim 31, wherein said water soluble polymer and said polymer emulsion is selected from the group consisting essentially of poly(ethylene oxide) (PEO), poly(vinyl alcohol) (PVA), and poly(vinyl acetate) (PVAc).

* * * * *